(12) United States Patent
Savalle et al.

(10) Patent No.: US 11,582,093 B2
(45) Date of Patent: Feb. 14, 2023

(54) USING STABILITY METRICS FOR LIVE EVALUATION OF DEVICE CLASSIFICATION SYSTEMS AND HARD EXAMPLES COLLECTION

(71) Applicant: Cisco Technology, Inc., San Jose, CA (US)

(72) Inventors: Pierre-André Savalle, Rueil-Malmaison (FR); Jean-Philippe Vasseur, Saint Martin D'uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 523 days.

(21) Appl. No.: 16/180,093

(22) Filed: Nov. 5, 2018

(65) Prior Publication Data
US 2020/0145287 A1 May 7, 2020

(51) Int. Cl.
*H04L 41/0813* (2022.01)
*H04L 41/12* (2022.01)
(Continued)

(52) U.S. Cl.
CPC .......... *H04L 41/0813* (2013.01); *H04L 41/12* (2013.01); *H04L 41/145* (2013.01);
(Continued)

(58) Field of Classification Search
CPC ... H04L 41/0813; H04L 41/12; H04L 41/145; H04L 43/04; H04L 43/08
See application file for complete search history.

(56) References Cited

U.S. PATENT DOCUMENTS 8,856,380 B2 * 10/2014 DelloStritto .......... H04L 9/0816
 709/236
8,886,799 B1 * 11/2014 Zhang ................ G06Q 30/0241
 709/224
(Continued)

OTHER PUBLICATIONS

Wei Sun: Stability of Machine Learning Algorithms, Ph.D. Dissertation, May 1, 2015, pp. 1-115: https://search.proquest.com/docview/1718548021?accountid=49204.
(Continued)

*Primary Examiner* — Dhairya A Patel
(74) *Attorney, Agent, or Firm* — Behmke Innovation Group LLC; Kenneth J. Heywood; Jonathon P. Western (57) ABSTRACT

In one embodiment, a label stability analyzer service receives classification data indicative of device type labels assigned to endpoints in a network by a device classification service. The label stability analyzer service counts device type label changes made by the device classification service to the endpoints. The label stability analyzer service computes variability metrics for the device type labels, wherein the variability metric for a device type label is based on a count of the device type label changes associated with that label. The label stability analyzer service determines, based on one of the variability metrics for a particular one of the device type labels exceeding a threshold value, a configuration change for the device classification service that adjusts how the device classification service applies the particular label to endpoints. The label stability analyzer service provides the configuration change to the device classification service.

16 Claims, 7 Drawing Sheets

(51) Int. Cl.
*H04L 41/14* (2022.01)
*H04L 43/04* (2022.01)
*H04L 43/08* (2022.01)
*H04L 67/125* (2022.01)

(52) U.S. Cl.
CPC .............. *H04L 43/04* (2013.01); *H04L 43/08* (2013.01); *H04L 67/125* (2013.01)

(56) References Cited

U.S. PATENT DOCUMENTS

| | | | | |
|---|---|---|---|---|
| 11,453,511 | B1* | 9/2022 | Moeykens | G07C 5/085 |
| 2005/0044208 | A1* | 2/2005 | Jones | H04L 43/00 709/224 |
| 2007/0185901 | A1* | 8/2007 | Gates | G06F 16/355 707/999.102 |
| 2007/0299957 | A1* | 12/2007 | Bevilacqua | G06F 11/3409 714/E11.192 |
| 2008/0002725 | A1* | 1/2008 | Alicherry | H04L 63/1458 370/401 |
| 2008/0103996 | A1* | 5/2008 | Forman | G06N 20/00 706/12 |
| 2008/0195970 | A1* | 8/2008 | Rechsteiner | G06F 16/4393 715/810 |
| 2009/0061946 | A1* | 3/2009 | George | H04W 8/005 455/566 |
| 2009/0316602 | A1* | 12/2009 | Nandy | H04L 45/02 370/254 |
| 2010/0114899 | A1* | 5/2010 | Guha | G06F 16/9535 707/E17.089 |
| 2010/0332682 | A1* | 12/2010 | Sharp | G06Q 10/00 709/248 |
| 2013/0006914 | A1* | 1/2013 | Ray | G06F 16/9535 707/738 |
| 2016/0275545 | A1* | 9/2016 | Dasdan | H04L 67/20 |
| 2017/0034305 | A1* | 2/2017 | Blevins | H04L 67/12 |
| 2017/0060906 | A1* | 3/2017 | Born | G06F 16/21 |
| 2017/0078170 | A1 | 3/2017 | Vasseur et al. | |
| 2017/0161761 | A1* | 6/2017 | Koh | H04L 41/145 |
| 2017/0279698 | A1* | 9/2017 | Sartran | H04L 41/147 |
| 2017/0279829 | A1 | 9/2017 | Vasseur et al. | |
| 2017/0279833 | A1 | 9/2017 | Vasseur et al. | |
| 2018/0139104 | A1* | 5/2018 | Seddigh | H04L 41/0213 |
| 2018/0159751 | A1 | 6/2018 | Zhang et al. | |
| 2018/0234302 | A1 | 8/2018 | James et al. | |
| 2018/0247188 | A1 | 8/2018 | Wong et al. | |
| 2018/0316555 | A1 | 11/2018 | Salgueiro | |
| 2018/0343317 | A1* | 11/2018 | Lakunishok | H04L 43/04 |
| 2019/0138650 | A1* | 5/2019 | Snider | G06F 16/9535 |
| 2020/0007391 | A1* | 1/2020 | Yang | H04L 63/14 |
| 2020/0007411 | A1* | 1/2020 | Arar | H04W 4/50 |
| 2020/0043480 | A1* | 2/2020 | Shen | G10L 15/22 |
| 2022/0173896 | A1* | 6/2022 | Rahman | H04L 41/12 |
| 2022/0245106 | A1* | 8/2022 | Dowler | G06F 16/248 |

OTHER PUBLICATIONS

European Search Report dated Feb. 26, 2020 in connection with European Application No. 19205958.

Nguyen, et al., "DÏoT: A Self-learning System for Detecting Compromised IoT Devices", arXiv:1804.07474v2, 18 pages, May 11, 2018, arXiv.org.

* cited by examiner

USING STABILITY METRICS FOR LIVE EVALUATION OF DEVICE CLASSIFICATION SYSTEMS AND HARD EXAMPLES COLLECTION

TECHNICAL FIELD

The present disclosure relates generally to computer networks, and, more particularly, to using stability metrics for live evaluation of device classification systems and hard examples collection.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a label stability analyzer service receives classification data indicative of device type labels assigned to endpoints in a network by a device classification service. The label stability analyzer service counts device type label changes made by the device classification service to the endpoints. The label stability analyzer service computes variability metrics for the device type labels, wherein the variability metric for a device type label is based on a count of the device type label changes associated with that label. The label stability analyzer service determines, based on one of the variability metrics for a particular one of the device type labels exceeding a threshold value, a configuration change for the device classification service that adjusts how the device classification service applies the particular label to endpoints. The label stability analyzer service provides the configuration change to the device classification service.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
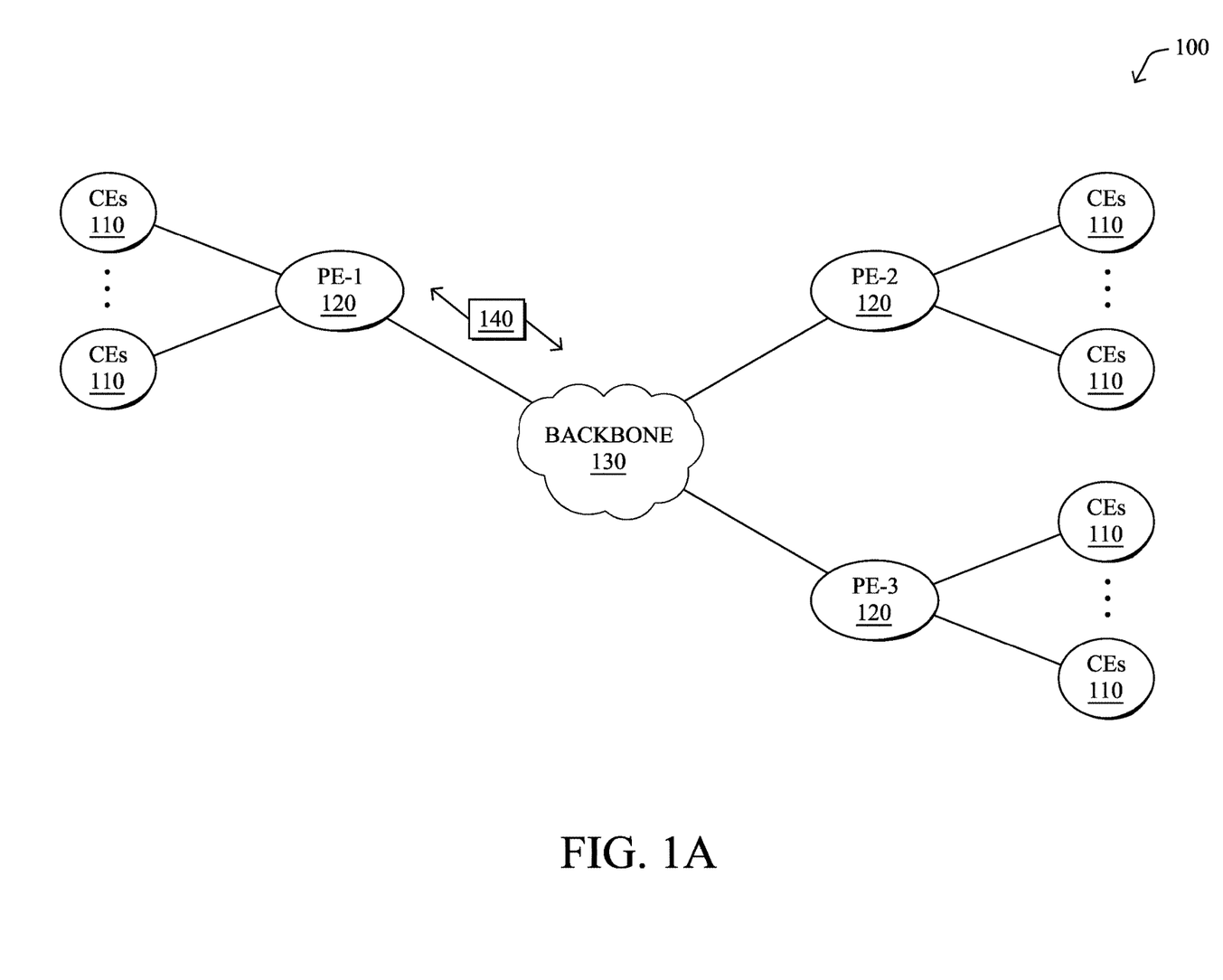
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
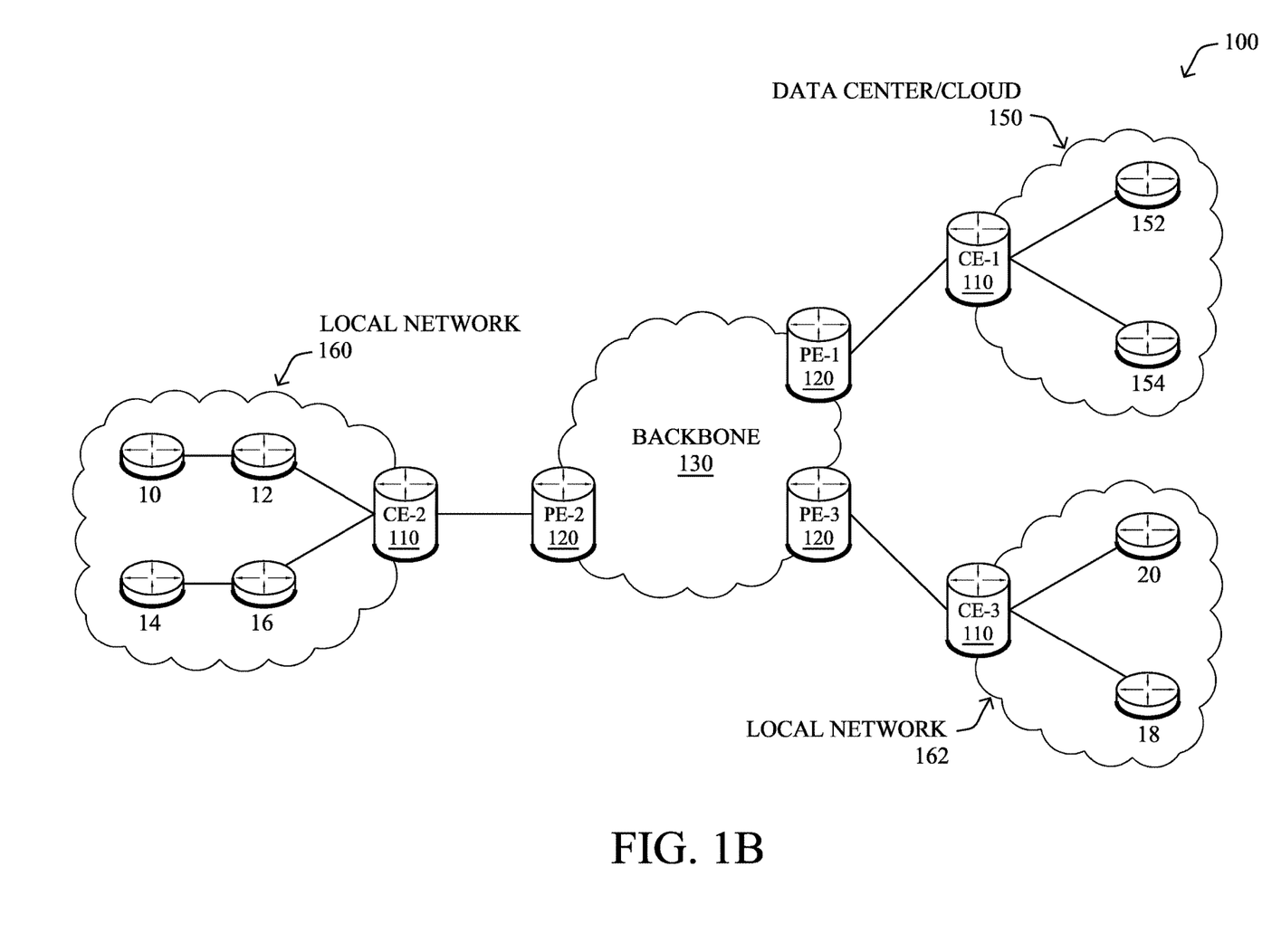

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
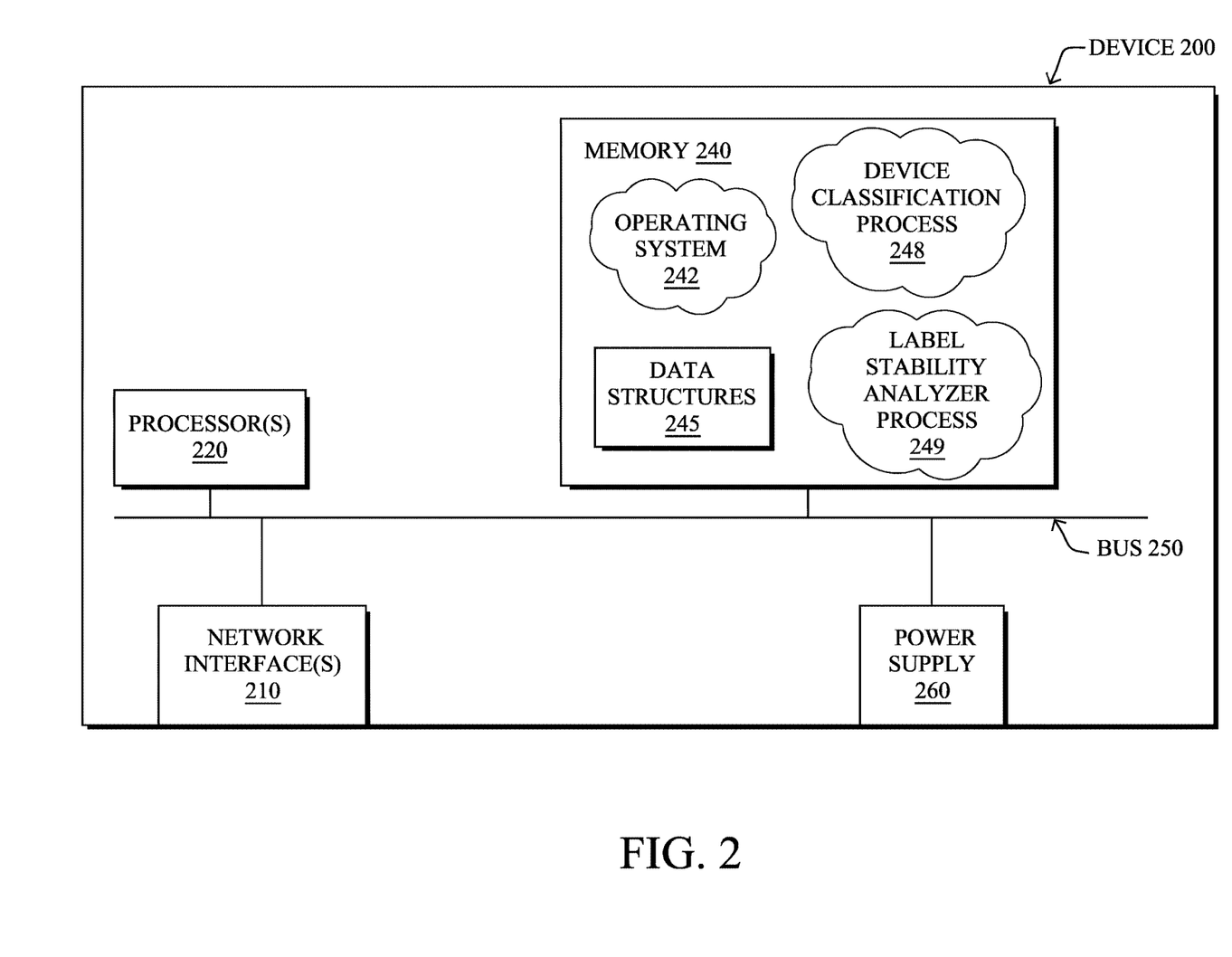
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a configuration analyzer process 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
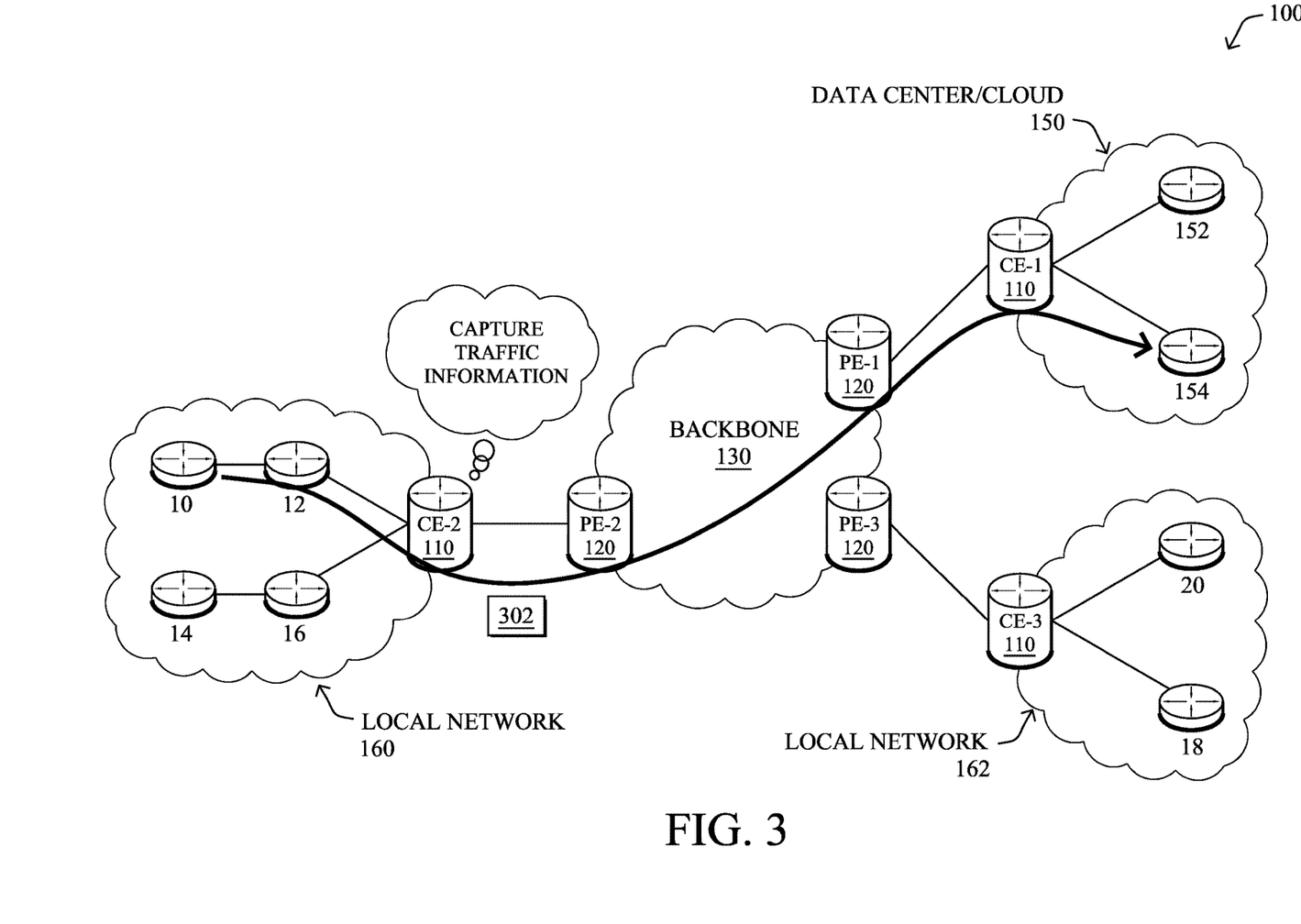
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

More specifically, most device classification systems (DCSs) today rely on simple rules and heuristics to classify devices. For instance, information extracted from DHCP or HTTP traffic can sometimes provide a pretty good clue as to the type of device. Notably, the DHCP vendor class identifier may directly indicate that the device is an Android phone, while the HTTP user agent may reveal more information about the operating system of the device. Similarly, the organizationally unique identifier (OUI) can be used to narrow down potential device types based on the corresponding manufacturer. Other characteristics that could help to classify a device by type are Link Layer Discovery Protocol (LLDP) information and manufacturer usage description (MUD) profiles. In further examples, device type classification can be achieved by using active and/or passive probing of devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A DCS may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

Figure 4:
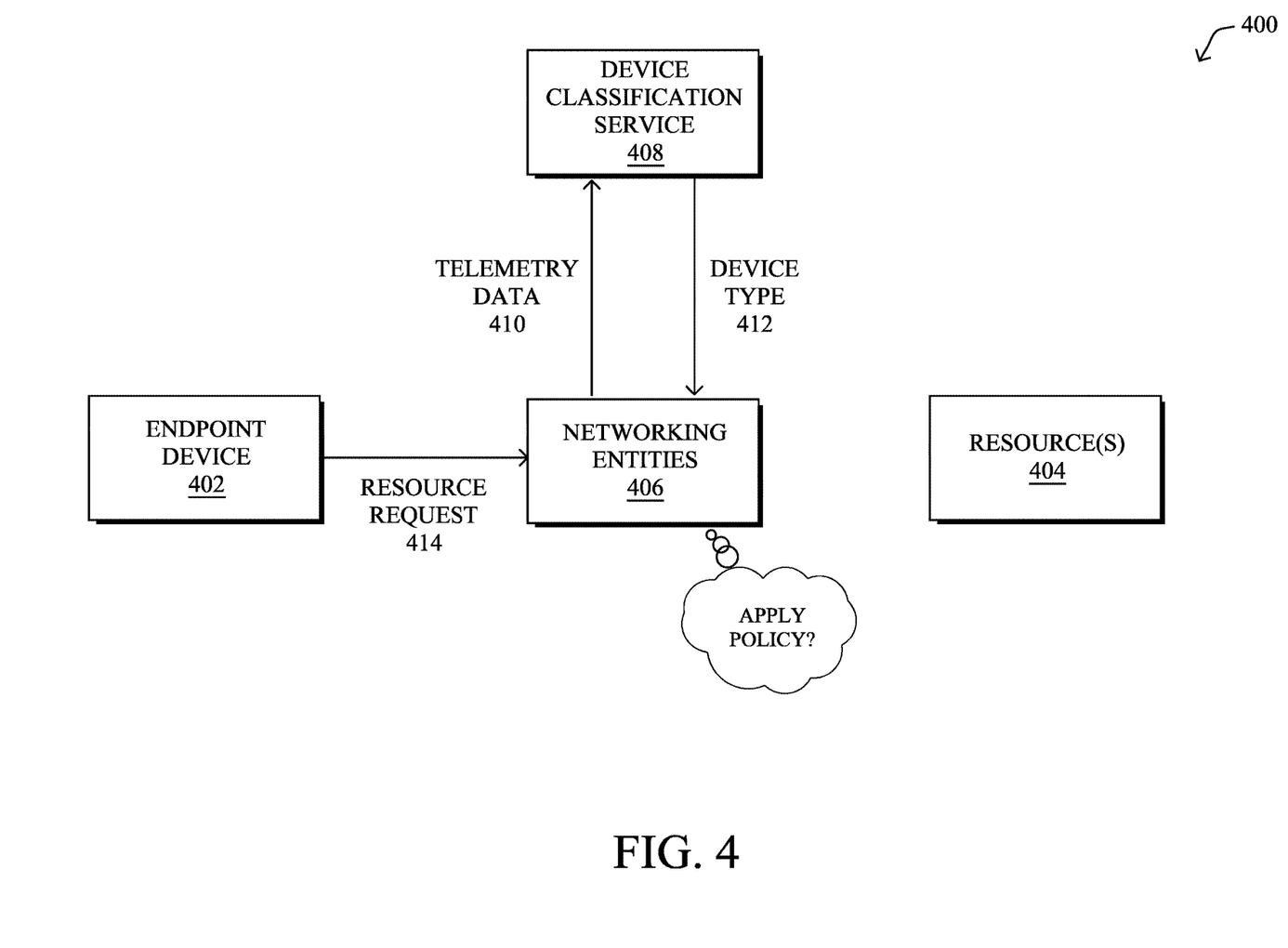
FIG. 4 illustrates an example of a device classification service in a network.

FIG. 4 illustrates an example of a device classification service 408 in a network, in various embodiments. As shown, network 400 may generally include an endpoint device 402 (e.g., a user device, a sensor, an actuator, etc.), any number of resources 404, and any number of networking entities 406 that are configured to provide connectivity between endpoint device 402 and resource(s) 404. For example, networking entities 406 may include access points, wireless LAN controllers (WLCs), switches, routers, security devices (e.g., firewalls, device identity services, etc.), and the like. Network resources 404 may include cloud-based services, specific servers or other endpoints, webpages, or any other resource with which endpoint device 402 could communicate.

Also as shown in FIG. 4 is device classification service 408 that may be hosted on one or more of networking entities 406 or be in communication therewith, either in the local network of networking entities 406 or at a remote location, such as being cloud-based. In general, device classification service 408 is configured to take as input telemetry data 410 captured by networking entity 406 regarding network traffic associated with endpoint device 402 and, based on the captured telemetry, identify the device type 412 of endpoint device 402 (e.g., by execution of device classification process 248, described previously). For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402. In various embodiments, device classification service 408 may use a machine learning-based classifier to classify telemetry data 410 and assign device type 412 to endpoint device 402.

Note that the classification of endpoint device 402 by service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether 402 is an iPhone 5s or an iPhone 6. Accordingly, in some embodiments, service 408 may also return the confidence values for the classification label(s) in device type 412 to networking entity 406.

The labeling of endpoint device 402 with a device type 412 by device classification service 408 may initiate enforcement of one or more network policies by networking entity 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking entities 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking entities 406 to assign a higher priority to traffic from endpoint device 402.

As noted above, many device classification systems (DCSs), such as device classification service 408, may use heuristics, rules, statistical models, and/or machine learning, to apply a device classification label to an endpoint, based on its observed network traffic. Although these approaches can correctly classify a wide range of devices in many situations, there is often no way to evaluate how well these methods are doing in practice without manual verification. This makes improving these methods difficult, as neither the network operator, nor the DCS system developer, can understand failure modes, such as incorrect or unstable classifications. In addition, the lack of quantitative visibility of a network operator into the accuracy of the device classifications makes relying on those classifications for security purposes a risky proposition.

Using Stability Metrics for Live Evaluation of Device Classification Systems and Hard Examples Collection The techniques herein allow for the continuous and automatic evaluation of the classifications made by a device classification system/service in a network. In some aspects, the label variability metrics introduced herein can be used to report difficult examples back to the device classification service so that the service can (i.) improve is future classifications (e.g., by adjusting its classification rules or parameters, removing noise in the input features used for classification, etc.), (ii.) attempt to adjust classifications for these difficult examples, to reduce the noise through an automated feedback loop. By doing so, the performance and confidence of the classification service can be improved both at very short time scales and in the long term, as well. In further aspects, the techniques herein are easy to implement in existing deployments as they only require access to the set of device classifications issued by the classification service, in their simplest embodiment. Evaluating label stability in live networks also allows for the identification of hard examples and mitigation of their impact.

Specifically, according to one or more embodiments of the disclosure as described in detail below, a label stability analyzer service receives classification data indicative of device type labels assigned to endpoints in a network by a device classification service. The label stability analyzer service counts device type label changes made by the device classification service to the endpoints. The label stability analyzer service computes variability metrics for the device type labels, wherein the variability metric for a device type label is based on a count of the device type label changes associated with that label. The label stability analyzer service determines, based on one of the variability metrics for a particular one of the device type labels exceeding a threshold value, a configuration change for the device classification service that adjusts how the device classification service applies the particular label to endpoints. The label stability analyzer service provides the configuration change to the device classification service.

Illustratively, the techniques described herein may be performed by hardware, software, and/or firmware, such as in accordance with the label stability analyzer process 249, which may include computer executable instructions executed by the processor 220 (or independent processor of interfaces 210) to perform functions relating to the techniques described herein, e.g., in conjunction with device classification process 248.

Operationally, the techniques herein introduce an automated mechanism to continuously evaluate the classifications of a device classification service/system. In various aspects, this evaluation is based on a simple insight: the classification service applying different device type labels to a given endpoint over time is an indication that the endpoint is not well classified. In particular, it is much more likely that the device classification service is producing the wrong classification in this case than the endpoint changing its inherent identity. Note also that such classification oscillations (e.g., the service fluctuating between labels for a given endpoint) may also be due to conflicting rules, including classification rules manually added by an end user.

In addition to conflicting classification rules, device type classifications can also change over time in the following conditions:

The classification outcome is, or was, incorrect.

The classification is still being refined—this is particularly true when additional sources of telemetry data become available, allowing to the classification service to refine its classification over time. In this case, the new classification is likely to be an improvement over the prior classification.

A given endpoint device may also have multiple identities or behavioral profiles. For example, if the classification service uses a device taxonomy that classifies endpoints according to their functionalities (e.g., a laptop used for IT, a sensoring gateway, etc.), then an endpoint may indeed have multiple identities/device type labels. In such a case, device identity changes may not be considered to be classification issues. Conversely, if the device type taxonomy used by the classification service refers to the manufacturer, make, or model of an endpoint (e.g., MacBook Pro release X, Samsung Galaxy smartphone, etc.), then a change of classification may very well be due to a classification error by the classification service.

Note that a device classification service can also wrongly classify a certain endpoint device and do so in a stable way. However, it is believed that the unstable cases represent the vast majority of failure modes for device classification systems. The following table illustrates the top 15 unstable device types observed in real networks, whereby the oscillation rate is computed as the fraction of samples for which for which a label change was observed for that endpoint:

TABLE 1

| deviceType | avgRate | numHours | numSamples | numDevices |
|---|---|---|---|---|
| MotorolaDroid-Device | 0.23871 | 1.329214e+03 | 1705 | 4 |
| OS_X_Leopard-Work | 0.181818 | 1.250000e+00 | 11 | 1 |
| ZTE-Device | 0.180562 | 1.421908e+04 | 6884 | 95 |
| Kyocera-Device | 0.169612 | 1.615292e+03 | 1068 | 12 |
| OS_X_MountainLion-Workstation | 0.165813 | 1.042148e+03 | 8553 | 12 |
| OS_X_SnowLeopard-Workstation | 0.157244 | 1.088196e+03 | 20842 | 19 |
| Vista-Workstation | 0.142979 | 1.708402e+03 | 16414 | 12 |
| Ubuntu-Workstation | 0.139549 | 1.227156e+5 | 218671 | 337 |
| OpenBSD-Workstation | 0.131592 | 1.046892e+02 | 3982 | 1 |
| Android-Google | 0.130689 | 1.699675e+05 | 390294 | 2115 |
| Android-Amazon-Phone | 0.127016 | 1.811183e+02 | 39 | 2 |
| Microsoft-Surface-RT-Tablet | 0.122480 | 1.823261e+03 | 13645 | 10 |
| Asus-Device | 0.109761 | 1.044231e+04 | 24337 | 41 |
| Linux-Workstation | 0.107797 | 2.606998e+05 | 2214064 | 12561 |
| Macintosh-Workstation | 0.102780 | 4.809567e+05 | 1554797 | 1055 |

Figure 5:
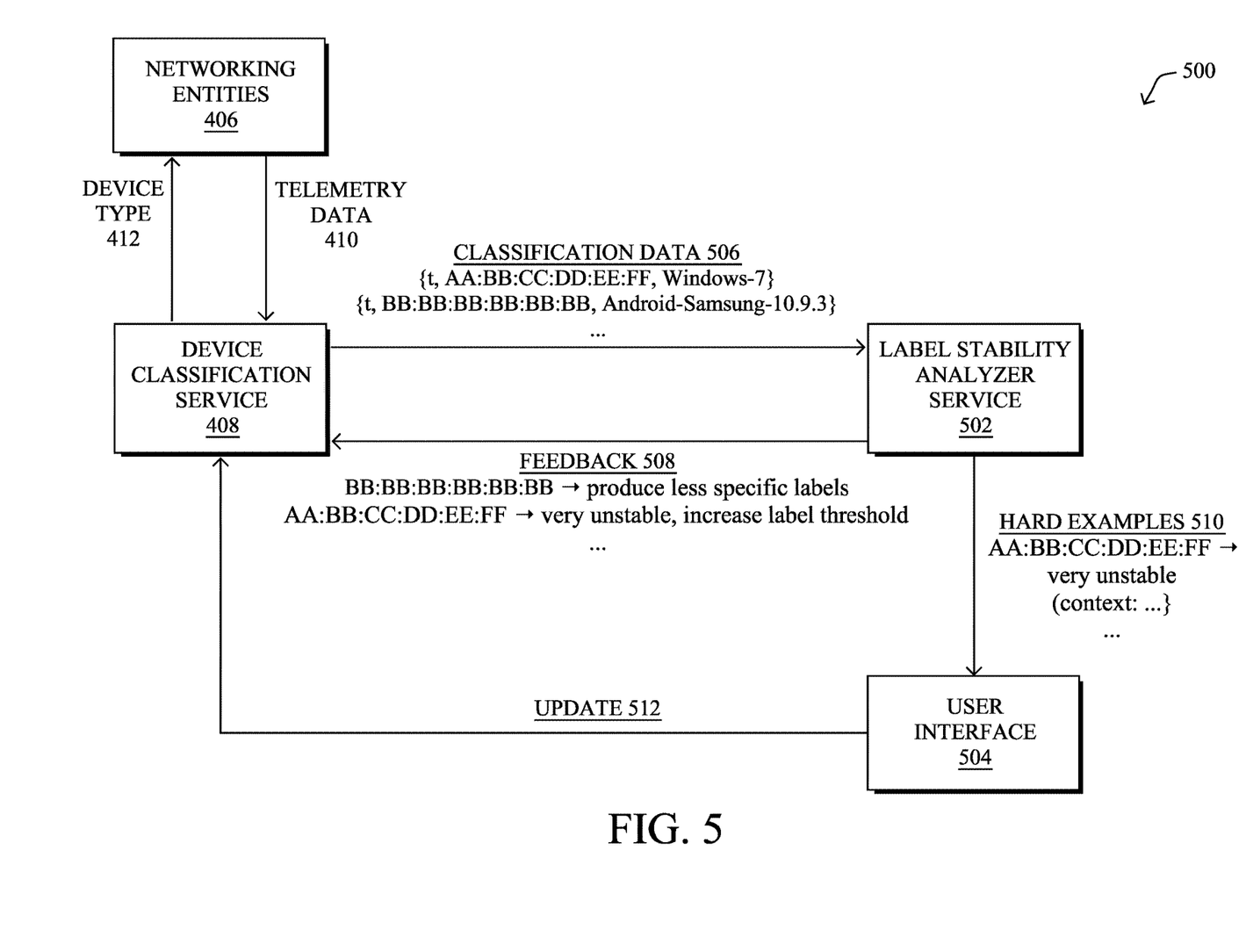
FIG. 5 illustrates an example architecture for assessing label stability for a device classification service.

FIG. 5 illustrates an example architecture 500 for assessing label stability for a device classification service, in various embodiments. As shown, architecture 500 may include any or all of the following components: device classification service 408 and networking entities 406, described previously with respect to FIG. 4, as well as a label stability analyzer service 502 and a user interface 504. In general, label stability analyzer service 502 may be implemented through execution of label stability analyzer process 249, as shown in FIG. 2, and may be executed on the same device or remotely from that of device classification service 408. For example, in some embodiments, label stability analyzer service 502 may be a cloud-based service, while device classification service 408 may be executed within the same network as that of networking entities 406. However, in further embodiments, both of services 502 and 408 may be cloud-based or implemented locally in the monitored network (e.g., directly on networking entities 406 or in communication therewith).

During operation, device classification service 408 may send classification data 506 to label stability analyzer service 502, either on a push or pull basis. In general, classification data 506 may include the device type classification label 412 that device classification service 408 applied to a given endpoint, as well as a unique identifier for the labeled endpoint. For example, common choices for the device identifier may be the MAC address or IP address of the endpoint, a combination thereof, or an identifier based on either or both of these addresses. Depending on device classification service 408, a given endpoint device may be classified only when connecting to the network, or more regularly, either based on a schedule or whenever new telemetry data 410 is observed for the endpoint device. Note that classification data 506, in some embodiments, may also be gathered for a given endpoint device (key) for multiple device classification services, as may be the case when multiple nodes in the network make use of device profiling (e.g., WLCs, identity service engines, etc.).

By way of example shown, assume that device classification service 408 has classified a set of endpoints that include the endpoints having MAC addresses of AA:BB:CC:DD:EE:FF and BB:BB:BB:BB:BB:BB at a time T=t. In such a case, device classification service 408 may send classification data 506 to label stability analyzer service 502 that includes the time of classification (e.g., T=t), the MAC addresses of these endpoints, and the device type labels that device classification service 408 applied to the endpoints (e.g., "Windows-7," "Android-Samsung-10.9.3," etc.). In some embodiments, classification data 506 may also include the feature vectors/traffic telemetry data that device classification service 408 used to arrive at these device type labels for the endpoints.

In various embodiments, label stability analyzer service 502 may use the classification data 506 from device classification service 408 to measure the variability of the labels that device classification service 408 applied to each of the indicated endpoints, as represented in classification data 506 by their device identifiers. A wide variety of possible formulations for the variability metrics are possible, to quantify the label stability of a device type label used by device classification service 408.

In one embodiment, label stability analyzer service 502 may compute the variability metric for a classification label based on the number of classification oscillations or re-classifications made by device classification service 408 involving a particular label. For example, label stability analyzer service 502 may use a history of classification data 506 to count the label changes made by device classification service 408 for the different endpoints within a certain period of time.

In further embodiments, label stability analyzer service 502 may also quantify the discrepancy between the different labels applied to a single endpoint, when computing the variability metric for a device type label. Indeed, device classification service 408 may use classification labels that belong to one or more taxonomies of labels. For example, one such taxonomy may be Manufactuer—Model—Version, increasing in specificity with each level. To this end, label stability analyzer service 502 may employ standardization, to compute the variability metric only at a given level of the taxonomy (e.g., by stripping out all version information from the labels conveyed by classification data 506, etc.). In some embodiments, label stability analyzer service 502 may base the variability metric for a label based on the distance(s) between that label and the label(s) to which device classification service 408 changed a classification of an endpoint. For example, label stability analyzer service 502 may average all of the pairwise distances between all of the labels seen, to compute the variability metric for a label. Alternatively, label stability analyzer service 502 may average the pairwise distances between consecutive labels in time, to compute the variability metric for a label. In some embodiments, label stability analyzer service 502 may also impose a minimum distance condition for a re-classification to be considered an issue. For example, if a given device classification does not change by more than a threshold amount of distance, label stability analyzer service 502 may ignore the classification change.

In another embodiment, in addition to the distance between labels, label stability analyzer service 502 may compute the variability metric for a label based in part on the severity of the classification change. Such a severity may be controlled by policy. For example, consider the case of device classification service 408 using a tree-based taxonomy for classification purposes. If, for example, a classification label for an endpoint changes from "Manufacturer X" to "Manufacturer Y," this may receive a higher severity score than if the classification change went from "Manufacturer X-Model A-Version N" to "Manufacturer X-Model A-Version M." In other words, a policy engine of label stability analyzer service 502 may specify not only the minimum distance between labels for a re-classification to be considered an issue, but also the types of classifications that are not allowed at all.

In further embodiments, label stability analyzer service 502 may also evaluate and detect any seasonality between classification changes and, potentially, the existence of loops between classifications. For example, label stability analyzer service 502 may also evaluate classification data 506 to detect when device classification service 408 changes a device label for an endpoint from label A→B→C→A, etc. Such data may be useful so as to determine whether the seasonality of the classification changes is due to activity of the endpoint or due to classification issues at device classification service 408.

If yet another embodiment, if the features used by device classification service 408 to apply a label to an endpoint are included in classification data 506, label stability analyzer service 502 may also quantify the variability of the input features used for device classification. In this case, label stability analyzer service 502 may assess the variance of the features available to device classification service 408 for a given endpoint. If the feature variance is too high (e.g., above a threshold), this may indicate that there is too much variability in the traffic behavior of the endpoint for device classification service 408 to reliably classify the endpoint, in the first place. Thus, in some cases, label stability analyzer service 502 may determine that a classification issue is attributable to the endpoint under scrutiny and is not a poor classification by device classification service 408.

Label stability analyzer service 502 may compute the feature variance on a per feature basis, in some cases. Similar to the metrics for label stability, label stability analyzer service 502 can also compute global metrics for the feature variances (e.g., the standard deviation of feature values), as well as metrics that take into account the time ordering of the data points. For instance, label stability analyzer service 502 may consider the average distance between two consecutive feature vectors in time for an endpoint, to quantify the feature variance for an input feature/traffic characteristic.

A key aspect of the techniques herein is a feedback loop mechanism between label stability analyzer service 502 and device classification service 408. In particular, label stability analyzer service 502 may provide feedback 508 to device classification service 408 regarding any labels having variability metrics above a defined threshold, to change the configuration of device classification service 408 (e.g., to adjust how service 408 applies a particular label to endpoints). In various cases, the configuration changes signaled to service 408 by service 502 may take the following forms:

Signal device classification service 408 to apply less specific labels than a particular label. For example, if the label "Android-Samsung-10.9.3" exhibits a high degree of label variability, label stability analyzer service 502 may indicate to device classification service 408 via feedback 508 that it should use a label higher up in the device type taxonomy (e.g., "Android" or "Android-Samsung" instead of "Android-Samsung-10.9.3"), e.g., a less specific label.

Signal device classification service 408 to adjust the confidence score used by a machine learning-based classifier of service 408 to label an endpoint with a particular label, if service 408 uses machine learning for the classifications. By increasing the confidence threshold of the classifier, the classifier will be less inclined to apply the unstable label to endpoints in the network. Note that this approach may ultimately mean that an endpoint will be classified by service 408 as "Unknown," which may still be preferable to unstable device type labels, which are confusing and misleading. In addition, unstable labels could also expose the network to various security risks, in some cases.

If label stability analyzer service 502 also assesses the feature variability of the features used by device classification service 408, it may do any or all of the following:

Prevent re-configuration of device classification service 408, if label stability analyzer service 502 determines that the label instability is attributable to variability in the traffic characteristics of one or more endpoints assigned that label.

Use feature sensitivity analysis to adjust the classification rules used by device classification service 408. For example, if a particular feature is found by service 502 to be particularly variable, it may signal to service 408 via feedback 508 to deemphasize the impact of the feature on the classification determination.

In various embodiments, label stability analyzer service 502 may also provide indications of "hard" examples 510 to a user interface for review by an expert user. More specifically, if the label variability metric for a given label exceeds a certain threshold, label stability analyzer service 502 may determine that it is particularly hard for device classification service 408 to classify endpoints with that device type. In turn, it may provide information regarding this hard example to user interface 504. In some cases, hard examples 510 may also include additional contextual information, such as from other systems, or from device classification service 408, itself, to aid the user in assessing the problem. In some cases, label stability analyzer service 502 may provide hard examples 510 to user interface 504 via a cloud subsystem, so as to allow multiple users to provide input to the classification problem. These users can even be associated with different networks.

In addition to the automatic configuration changes to device classification service 408 that label stability analyzer service 502 may implement, service 408 may also receive manual updates 512 via user interface 504. For example, if a particular label is very unstable, label stability analyzer service 502 may signal a first configuration change to device classification service 408, to increase the label threshold used by service 408 to apply that label to an endpoint. In such a case, a user operating user interface 504 may also review the application(s) of that label and determine that the label instability is due to an incorrect classification rule. In turn, user interface 504 may provide update 512 to device classification service 408 with a second configuration change, to implement the corrected classification rule on service 408.

Figure 6:
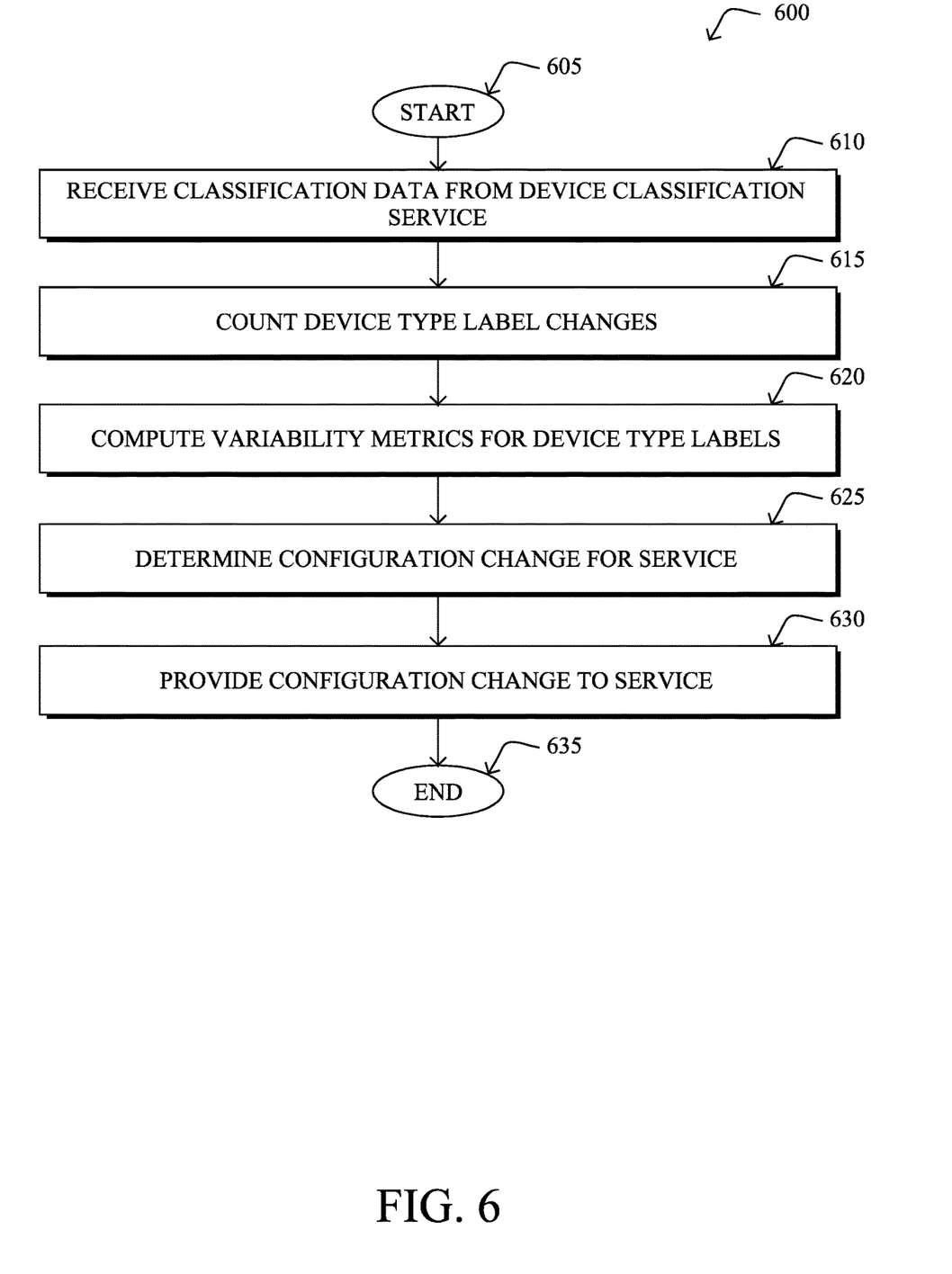
FIG. 6 illustrates an example simple procedure for assessing label stability of a device classification service.

FIG. 6 illustrates an example simplified procedure for assessing label stability of a device classification service, in accordance with one or more embodiments described herein. For example, a non-generic, specifically configured device (e.g., device 200) may perform procedure 600 by executing stored instructions (e.g., process 249), to provide a label stability analyzer service to a device classification service. The procedure 600 may start at step 605, and continues to step 610, where, as described in greater detail above, the label stability analyzer service may receive classification data indicative of device type labels assigned to endpoints in a network by a device classification service. In some cases, the labels may belong to one or more device type taxonomies. For example, one taxonomy may label an endpoint according to its manufacturer, model, and/or version.

At step 615, as detailed above, the label stability analyzer service may count device type label changes made by the device classification service to the endpoints. For example, the label stability analyzer service may count the number of times the device classification service swapped labels for an endpoint. In some cases, the service may also track when the classification service oscillates between labels for a given endpoint.

At step 620, the label stability analyzer service may compute variability metrics for the device type labels, as described in greater detail above. In some embodiments, the variability metric for a device type label is based on a count of the device type label changes associated with that label. For example, in a simple case, the label stability analyzer service may determine that a particular label is changed to a different label 28% of the time. In further embodiments, the label stability analyzer service may also take into account the distance between the labels for an endpoint, when computing the variability metrics. For example, a re-classification of an endpoint to also specify the version of a particular device model may be ignored or rated lower than a re-classification of the endpoint to being from a different manufacturer altogether.

At step 625, as detailed above, the label stability analyzer service may determine, based on one of the variability metrics for a particular one of the device type labels exceeding a threshold value, a configuration change for the device classification service that adjusts how the device classification service applies the particular label to endpoints. For example, the label stability analyzer service may determine that the label is too specific, thus causing classification issues, and that the classification service should decrease its specificity. In another example, such as when the classification service uses machine learning to perform the classification, the label stability analyzer service may determine that the classification service should adjust the confidence score used by the classifier to apply the label to endpoints.

At step 630, the label stability analyzer service may provide the configuration change to the device classification service, as described in greater detail above. In doing so, the label stability analyzer service and the device classification service may form a feedback loop that allows for the automatic adjustment of the classifications. In further embodiments, the label stability analyzer service may also provide an indication of the particular device type label to a user interface an example of a hard classification for the device classification service. For particularly hard classifications (e.g., those labels whose variability metrics are above a certain threshold), this may allow any number of users to refine the criteria that the device classification service should use to apply the label to endpoints. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the analysis of the performance of a device classification service in terms of the stability of its device classification labels. For example, the techniques herein are able to detect when the service changes the label of an endpoint over time, which is often an indicator of misconfigurations at the classification service. In further aspects, the techniques herein introduce a feedback loop mechanism, so as to automatically adjust the configuration of the classification service. Additionally, the techniques herein can also identify cases whereby the label instability for a certain endpoint are due to changing behaviors of the endpoint, rather than a misclassification by the classification service.

While there have been shown and described illustrative embodiments that provide for using stability metrics for live evaluation of device classification systems and hard examples collection, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
receiving, at a label stability analyzer service, classification data indicative of device type labels assigned to endpoints in a network by a device classification service;

counting, by the label stability analyzer service, device type label changes made by the device classification service to the endpoints;

generating, by the label stability analyzer service, variability metrics for the device type labels based on the counted device type label changes, wherein the variability metrics indicate how often the device classification service changed a device type label assigned to a given endpoint to a different device type label during a period of time;

determining, by the label stability analyzer service and based on one of the generated variability metrics for a particular one of the device type labels exceeding a threshold value, a configuration change for the device classification service that adjusts how the device classification service applies the particular device type label to endpoints; and providing, by the label stability analyzer service, the configuration change to the device classification service that causes the device classification service to apply a device type label to the endpoints that is less specific than the particular device type label, wherein the less specific device type label is higher in a device type taxonomy than the particular device type label, and wherein the variability metrics for the device type labels are further based on pairwise distances between the device type labels according to the device taxonomy.

2. The method as in claim 1, wherein the device type taxonomy is indicative of at least one of a device manufacturer, a device model from the device manufacturer, and a version of the device model.

3. The method as in claim 1, wherein the device classification service uses a machine learning-based classifier to assign device type labels to the endpoints in the network, and wherein the configuration change adjusts a confidence score used by the classifier to label endpoints with the particular device type label.

4. The method as in claim 1, wherein the classification data includes traffic features used by the device classification service to assign device classification labels to endpoints in the network, the method further comprising:

determining, by the label stability service and using the received classification data, feature variance metrics for the traffic features; and providing, by the label stability service, a second configuration change to the device classification service when one of the feature variance metrics exceeds a feature variance threshold.

5. The method as in claim 4, wherein the second configuration change adjusts the set of traffic features associated with a device type label.

6. The method as in claim 1, further comprising:

identifying, by the label stability service and based on the received classification data, a seasonal classification oscillation by the device classification service with respect to one of the endpoints.

7. The method as in claim 1, further comprising:

providing, by the label stability analyzer service and based on the variability metric for the particular device type label, an indication of the particular device type label to a user interface an example of a hard classification for the device classification service.

8. An apparatus, comprising:

one or more network interfaces to communicate with a network;

a processor coupled to the network interfaces and configured to execute one or more processes; and a memory configured to store a process executable by the processor, the process when executed configured to:

receive classification data indicative of device type labels assigned to endpoints in a network by a device classification service;

count device type label changes made by the device classification service to the endpoints;

generate variability metrics for the device type labels based on the counted device type label changes, wherein the variability metrics indicate how often the device classification service changed a device type label assigned to a given endpoint to a different device type label during a period of time;

determine, based on one of the generated variability metrics for a particular one of the device type labels exceeding a threshold value, a configuration change for the device classification service that adjusts how the device classification service applies the particular device type label to endpoints; and provide the configuration change to the device classification service that causes the device classification service to apply a device type label to the endpoints that is less specific than the particular device type label, wherein the less specific device type label is higher in a device type taxonomy than the particular device type label, and wherein the variability metrics for the device type labels are further based on pairwise distances between the device type labels according to the device taxonomy.

9. The apparatus as in claim 8, wherein the device type taxonomy is indicative of at least one of a device manufacturer, a device model from the device manufacturer, and a version of the device model.

10. The apparatus as in claim 8, wherein the device classification service uses a machine learning-based classifier to assign device type labels to the endpoints in the network, and wherein the configuration change adjusts a confidence score used by the classifier to label endpoints with the particular device type label.

11. The apparatus as in claim 8, wherein the classification data includes traffic features used by the device classification service to assign device classification labels to endpoints in the network, wherein the process when executed is further configured to:

determine, using the received classification data, feature variance metrics for the traffic features; and provide a second configuration change to the device classification service when one of the feature variance metrics exceeds a feature variance threshold.

12. The apparatus as in claim 11, wherein the second configuration change adjusts the set of traffic features associated with a device type label.

13. The apparatus as in claim 8, wherein the process when executed is further configured to:

identify, and based on the received classification data, a seasonal classification oscillation by the device classification service with respect to one of the endpoints.

14. The apparatus as in claim 8, wherein the process when executed is further configured to:

provide, based on the variability metric for the particular device type label, an indication of the particular device type label to a user interface an example of a hard classification for the device classification service.

15. A tangible, non-transitory, computer-readable medium storing program instructions that cause a label stability analyzer service to execute a process comprising:
- receiving, at the label stability analyzer service, classification data indicative of device type labels assigned to endpoints in a network by a device classification service;
- counting, by the label stability analyzer service, device type label changes made by the device classification service to the endpoints;
- generating, by the label stability analyzer service, variability metrics for the device type labels based on the counted device type label changes, wherein the variability metrics indicate how often the device classification service changed a device type label assigned to a given endpoint to a different device type label during a period of time;
- determining, by the label stability analyzer service and based on one of the generated variability metrics for a particular one of the device type labels exceeding a threshold value, a configuration change for the device classification service that adjusts how the device classification service applies the particular device type label to endpoints; and
- providing, by the label stability analyzer service, the configuration change to the device classification service that causes the device classification service to apply a device type label to the endpoints that is less specific than the particular device type label, wherein the less specific device type label is higher in a device type taxonomy than the particular device type label, and wherein the variability metrics for the device type labels are further based on pairwise distances between the device type labels according to the device taxonomy.

16. The computer-readable medium as in claim 15, wherein the device classification service uses a machine learning-based classifier to assign device type labels to the endpoints in the network, and wherein the configuration change adjusts a confidence score used by the classifier to label endpoints with the particular device type label.

* * * * *